United States Patent [19]

Fulmer

[11] Patent Number: 4,833,885
[45] Date of Patent: May 30, 1989

[54] MASTER CYLINDER AND PROPORTIONING VALVE THEREFOR

[75] Inventor: Keith H. Fulmer, Mishawaka, Ind.

[73] Assignee: Allied-Signal Inc., Morristown, N.J.

[21] Appl. No.: 797,760

[22] Filed: Nov. 12, 1985

Related U.S. Application Data

[63] Continuation of Ser. No. 596,177, Apr. 2, 1984, abandoned.

[51] Int. Cl.[4] .................. F15B 7/00; B60T 11/20; B60T 11/28; B60T 13/00
[52] U.S. Cl. ........................... 60/591; 60/562; 60/589; 303/9.63
[58] Field of Search ............ 60/591, 562, 589; 188/349; 303/6 C, 9.63; 137/505.25, 508

[56] References Cited

U.S. PATENT DOCUMENTS

| 1,841,615 | 1/1932 | Loughead et al. | 60/584 |
|---|---|---|---|
| 2,167,721 | 8/1939 | La Brie | 60/54.6 |
| 2,671,989 | 3/1954 | Schwarz | 137/505.25 |
| 3,312,062 | 4/1967 | MacDuff | 60/54.6 |
| 3,374,868 | 3/1968 | Cumming | 60/591 |
| 3,964,795 | 6/1976 | Mathues | 303/6 C |
| 4,038,824 | 8/1977 | Okamoto et al. | 60/591 |
| 4,319,456 | 3/1982 | Kubota | 60/591 |
| 4,437,310 | 3/1984 | Morita et al. | 60/562 |
| 4,477,122 | 6/1984 | Hayashida | 188/349 |

FOREIGN PATENT DOCUMENTS

| 1907930 | 10/1969 | Fed. Rep. of Germany . | |
| 2253653 | 7/1975 | France . | |
| 55-8901 | 11/1980 | Japan | 60/591 |
| 1417023 | 12/1975 | United Kingdom . | |
| 1453854 | 5/1976 | United Kingdom . | |
| 2004339 | 3/1979 | United Kingdom . | |
| 2025551 | 1/1980 | United Kingdom . | |
| 2025550 | 10/1980 | United Kingdom . | |
| 2052659 | 1/1981 | United Kingdom . | |

Primary Examiner—Robert E. Garrett
Assistant Examiner—George Kapsalas
Attorney, Agent, or Firm—Larry J. Palguta; Ken C. Decker

[57] ABSTRACT

A master cylinder and proportioning valve therefor comprises a housing forming a bore with a piston movable therein and a porportioning valve engageable with the piston to control operaton of the proportioning valve in response to movement of the piston.

18 Claims, 1 Drawing Sheet

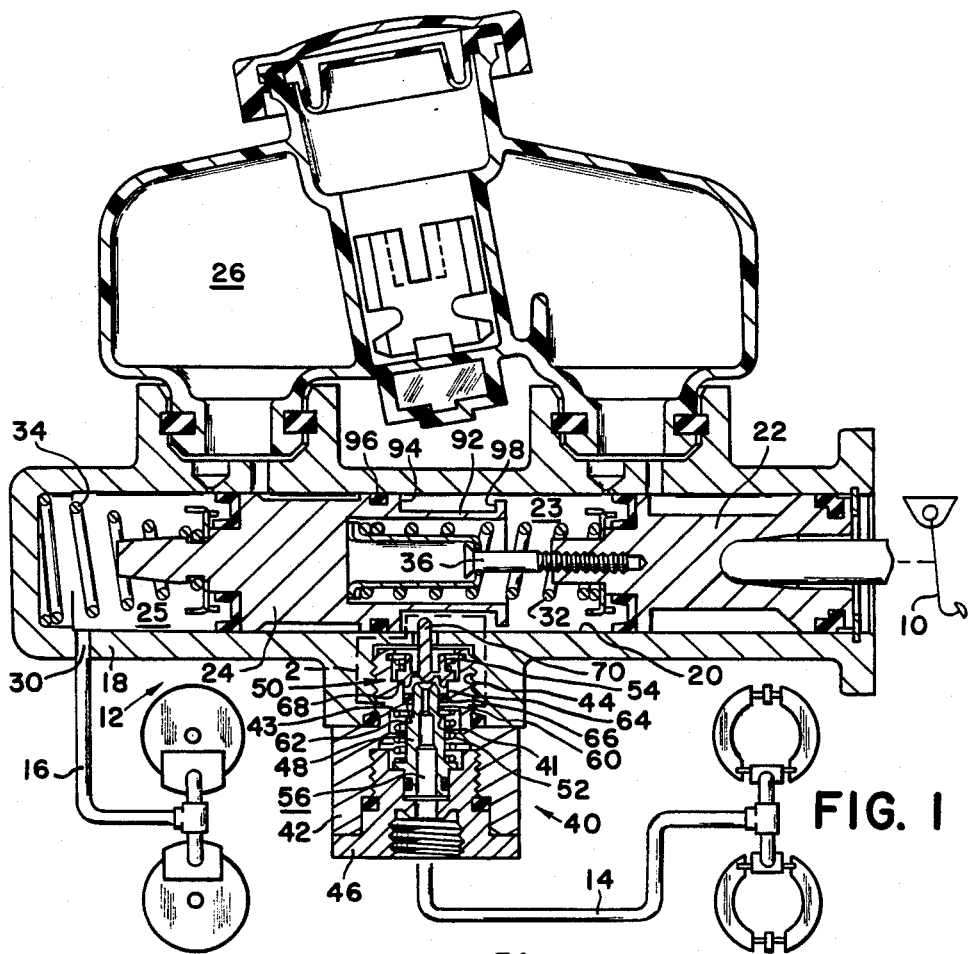
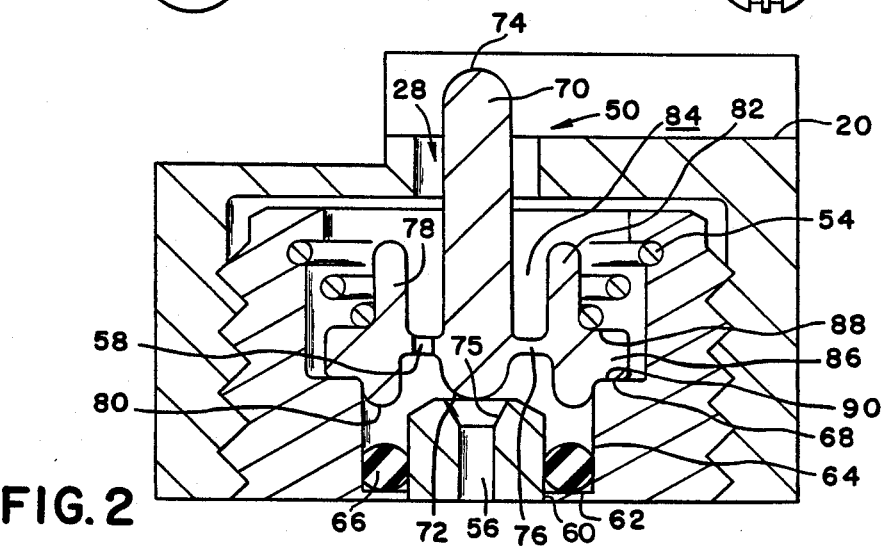

MASTER CYLINDER AND PROPORTIONING VALVE THEREFOR

This is a continuation of application Ser. No. 596,177 filed Apr. 2, 1984, now abandoned.

The present invention relates to a master cylinder and proportioning valve therefor and, in particular, a proportioning valve which is rendered inoperable in response to the position of a piston for the master cylinder.

A screw-in proportioning valve is disclosed in U.S. Pat. No. 4,213,655, Brademeyer, issued July 22, 1980. This proportioning valve is adapted to threadably couple with the master cylinder housing so that a valve member cooperates with a poppet to control fluid pressure communication through the proportioning valve. The proportioning valve is insensitive to piston movement in the master cylinder bore so that even if a failure occurs in a separate brake circuit, the proportioning valve is operable to reduce brake fluid pressure in its associated brake circuit. In U.S. Pat. No. 3,686,864, Shutt, issued Aug. 29, 1972, a warning circuit is utilized to bypass a proportioning valve.

The present invention comprises a housing with a bore receiving a piston, the piston being movable in the bore, the proportioning valve including a valve member movable relative to the housing and defining an opening therethrough for communicating fluid pressure from the bore to a brake circuit and a poppet cooperating with the valve member to alter fluid communication through the valve member opening in response to the movement of the valve member, characterized in that the poppet is engageable with the piston to pivot away from a rest position to a bypass position wherein fluid pressure communication through the valve member opening is substantially unrestricted regardless of the position of the valve member relative to the housing.

It is an advantage of the present invention that the poppet interferes with movement of the piston only when the piston has moved beyond a normal travel during braking.

The present invention provides a simplified poppet valve mechanism compared to the proportioning valve mechanism disclosed in now-abandoned Patent Application Ser. No. 556,814 entitled "A MASTER CYLINDER AND PROPORTIONING VALVE ASSEMBLY" and filed Dec. 1, 1983.

In the drawings,

FIG. 1 is a cross sectional view of a master cylinder and proportioning valve in a brake system, and FIG. 2 is an enlarged view of the circumscribed portion in FIG. 1.

A brake system for a vehicle includes a brake pedal 10 coupled to a master cylinder 12 in order to communicate fluid pressure to brake circuits 14 and 16 during braking. The master cylinder 12 includes a housing 18 with a bore 20 receiving a primary piston 22 and a secondary piston 24. A pair of pressure chambers 23 and 25 are formed within bore 20. The bore 20 is in communication with a reservoir 26 in a rest position for pistons 22 and 24 and the bore communicates via outlet ports 28 and 30 with brake circuits 14 and 16, respectively. A pair of return springs 32 and 34 bias the pistons 22 and 24 to their rest positions while a top hat assembly 36 is disposed between the pistons to control the spacing therebetween in the rest position.

The outlet port 28 threadably receives a proportioning valve 40 so that fluid pressure communicated to brake circuit 14 is communicated through the proportioning valve 40. The proportioning valve includes a body 42 with a threaded end 44 coupled to housing 18 at port 28, a plug 46 coupled to the body 42, a valve member 48 extending between the body and the plug, and a poppet 50 opposing the valve member. A first spring 52 biases the valve member to its rest position abutting the plug 46 while a second spring 54 biases the poppet to its rest position abutting the body 42. The valve member 48 is provided with an opening 56 and the poppet is apertured at 58 so that fluid pressure communicates from the bore 20 to the brake circuit 14. The body 42 defines a first surface 60 slidably engaging the valve member 48, a first shoulder 62 adjoining surface 60, a second surface 64 spaced from valve member 48 to define a space for O-ring seal 66, and a second shoulder 68 engageable with the poppet 50.

The poppet 50 includes a central stem 70 with a first end 72 adjacent the central seat 75 of opening 56 and a second end 74 extending inwardly from port 28 into the bore 20. A web 76 extends outwardly from the stem 70 to define the aperture (or apertures) 58 and connect with a cylindrical skirt 78. The skirt 78 defines a first end 80 extending outwardly past the second shoulder 68 to oppose inward movement of seal 66. The first end 80 is also engageable with the second surface 64 to center the stem 70 relative to the valve member opening 56. The skirt 78 defines a second end 82 extending inwardly from the web 76 to keep the spring 54 away from aperture 58 so that a channel 84 between the second end 82 and the stem provides unrestricted communication between the bore 20 and the aperture 58. The skirt is provided with an outwardly extending rim 86 having an inner surface 88 forming a stop for the second spring 54 and an outer surface 90 normally in abutment with the body second shoulder 68.

The master cylinder piston 24 forms a groove 92 on the end adjacent piston 22. The groove 92 extends from a first side 94 adjacent piston seal 96 to a second side 98. In the rest position for the piston 24, the poppet stem 70 extends into the groove 92 adjacent the side 94.

During normal braking, the brake pedal 10 is depressed to move piston 22 toward piston 24. Both pistons are moved in the bore to close the bore to the reservoir 26 and generate fluid pressure in the chambers formed by the pistons. As a result, fluid pressure is communicated from the bore to the brake circuits 14 and 16 to effectuate a brake application. So long as the fluid pressure in brake circuit 14 remains below a predetermined valve, the valve member of the proportioning valve 40 will remain sufficiently spaced from the poppet 50 so that fluid communication via aperture 58 and opening 56 is uninterrupted. Above the predetermined value, the valve member is pressure responsive in a well known manner to move towards the poppet 50 so that the poppet first end 72 cooperates with the central seat 75 of the valve member 48 to close the opening 56. As a result, the fluid pressure downstream of the valve member is less than the fluid pressure developed in the bore 20.

In a fully braked position, the fluid pressure in chamber 25 prevents further movement of piston 24 while the fluid pressure in chamber 23 prevents further movement of piston 22. With fluid pressure retained in chamber 25, the piston 24 is displaced to contract spring 34 such that poppet stem 70 remains in the groove, albeit spaced from the rest position, in spaced relation to the end 98. If the brake circuit 16 develops a leak, the chamber 25 will not retain fluid pressure so that the piston 24 will move to an end of bore 20 to engage the side 98 with the poppet stem 70 and pivot the latter about the left edge of outer surface 90. The pivoted poppet displaces the first end 72 away from the central seat of the valve member 48 to a bypass position so that when the valve member moves toward the poppet in response to fluid pressure in cicuit 14, the first end 72 will remain sufficiently spaced therefrom to permit unrestricted fluid communication between the bore 20 and the circuit 14. A shoulder 41 on the valve member 40 abuts a shoulder 43 on the body 42 to limit movement of the valve member in the direction of the poppet 50. The poppet first end 72 will be pivoted to a position spaced from the central seat of the valve member even with the latter abutting the shoulder 43 so long as the piston 24 is fully stroked in response to a leak of failure in circuit 16. Once the leak is repaired, the piston 24 will generate fluid pressure in chamber 25 so that the travel for piston 24 will be limited by fluid pressure in chamber 24 and the piston will remain spaced from the poppet stem 70 to permit normal operation of the proportioning valve 40.

I claim:

1. A master cylinder and proportioning valve therefor, comprising a housing with a bore receiving a piston, the piston being movable in the bore, the proportioning valve including a valve body having a valve member movable relative to the housing and defining a valve member opening therethrough for communicating fluid pressure from the bore to a brake circuit, and a poppet cooperating with the valve member to alter fluid communication through the valve member opening in response to movement of the valve member, characterized in that the housing defines a port communicating the bore with a central seat of the valve member and the valve member opening, the poppet comprising a stem extending through the port into the bore so that the stem is normally spaced from the housing to permit multi-directional tilting movement of the stem in the port when the stem is engaged with the piston, the poppet also extending toward the central seat and valve member opening, an aperture which permits permanent and continuous fluid communication from the bore to the valve member, a radially extending portion which engages a portion of the valve body, and a raised end extending longitudinally relative to the poppet and providing an outer periphery of an upper portion of the poppet, a resilient member being disposed between the housing and poppet to bias the poppet away from the housing, the resilient member disposed about the outer periphery of the upper portion of the poppet to surround the upper portion, the raised end positioning a first end of the resilient member on the poppet so as to keep the first end away from said aperture and prevent the first end from obstructing fluid flow through the aperture, the poppet engageable with the piston to pivot away from a rest position to a bypass position wherein the radially extending portion of the poppet pivots about the portion of the valve body so that the poppet moves away from said central seat to create an effective fluid path through the valve member opening that is substantially unrestricted regardless of the position of the valve member relative to the housing.

2. The master cylinder and proportioning valve in accordance with claim 1, wherein the valve body includes stop means engageable by the valve member to limit movement of the valve member toward the housing.

3. The master cylinder and proportioning valve in accordance with claim 1, wherein the piston defines a groove extending longitudinally, the stem extending into the bore for disposition within the groove and normally in spaced relation to the piston.

4. The master cylinder and proportioning valve in accordance with claim 3, wherein the groove extends longitudinally between opposite end walls and the stem is engageable with one of the end walls when the poppet is in a bypass position.

5. The master cylinder and proportioning valve in accordance with claim 1, wherein the stem extends from a first end adjacent the valve member to a second end adjacent the piston, and the raised end comprises a substantially cylindrical skirt connected to the stem by a web portion of the radially extending portion, a first end of the skirt cooperating with the portion of the valve body to locate the poppet in the body and a second end of the skirt cooperating with the resilient member which biases the poppet to a rest position.

6. The master cylinder and proportioning valve in accordance with claim 5, wherein the first end of the skirt includes an outwardly extending ridge normally abutting the portion of the valve body when the poppet is in the rest position and the radially extending portion of the poppet pivotally engaging the body when the poppet is pivoted to a bypass position.

7. The master cylinder and proportioning valve in accordance with claim 6, wherein the web portion is provided with the aperture to communicate fluid pressure from the bore to the valve member.

8. The master cylinder and proportioning valve in accordance with claim 7, wherein the stem is longer from the web portion to the second end than from the web portion to the first end.

9. The master cylinder and proportioning valve in accordance with claim 5, wherein the skirt extends about a shoulder of the portion of the valve body in order to locate the poppet relative to the valve body.

10. A master cylinder and proportioning valve therefor, comprising a master cylinder housing having a bore receiving a piston movable therein and a housing port communicating the bore with the proportioning valve, the proportioning valve including a valve body having a valve member movable relative to the housing and defining a valve member opening through the valve body for communicating fluid pressure from the bore to a brake circuit, and a poppet cooperating with the valve member to alter fluid communication through the valve member opening in response to movement of the valve member, characterized in that the poppet comprises an integral poppet with a stem extending through the port into the bore so that the stem is spaced from the housing to permit multi-directional tilting movement of the stem in the port when the stem is engaged with the piston, an aperture permitting continuous fluid communication between the bore and the valve member, a radially extending portion which engages the valve body, and a raised end extending longitudinally relative to the poppet to provide an outer periphery of an upper part of the poppet, resilient means disposed between the housing and poppet to bias the poppet away from the housing, the resilient means positioned about the outer periphery of the upper portion of the poppet to surround the upper portion, the raised end positioning a first end of the resilient means on the poppet and keeping the first end spaced from said aperture in order to prevent the first end from restricting fluid flow through the aperture, the poppet engageable with the piston to pivot away from a rest position to a bypass position wherein the radially extending portion of the poppet pivots about the portion of the valve body so that the poppet moves away from said valve member opening to create an effective fluid path through the valve member opening that is substantially unrestricted regardless of the position of the valve member relative to the housing.

11. The master cylinder and proportioning valve in accordance with claim 10, wherein the valve body includes a stop means engageable by the valve member to limit movement of the valve member toward the housing.

12. The master cylinder and proportioning valve in accordance with claim 10, wherein the piston defines a groove extending longitudinally, the stem extending into the bore for disposition within the groove and normally in spaced relation to the piston.

13. The master cylinder and proportioning valve in accordance with claim 12, wherein the groove extends longitudinally between opposite end walls and the stem is engageable with one of the end walls when the poppet is in a bypass position.

14. The master cylinder and proportioning valve in accordance with claim 10, wherein the stem extends from a first end adjacent the valve member to a second end adjacent the piston, and the raised end comprises a substantially cylindrical skirt connected to the stem by a web portion of the radially extending portion, a first end of the skirt cooperating with the portion of the valve body to locate the poppet in the body and a second end of the skirt cooperating with the resilient means which biases the poppet to a rest position.

15. The master cylinder and proportioning valve in accordance with claim 14, wherein the first end of the skirt includes an outwardly extending ridge normally abutting the portion of the valve body when the poppet is in the rest position and the radially extending portion of the poppet pivotally engaging the body when the poppet is pivoted to a bypass position.

16. The master cylinder and proportioning valve in accordance with claim 15, wherein the web portion is provided with the aperture to communicate fluid pressure from the bore to the valve member.

17. The master cylinder and proportioning valve in accordance with claim 16, wherein the stem is longer from the web portion to the second end than from the web portion to the first end.

18. The master cylinder and proportioning valve in accordance with claim 14, wherein the skirt extends about a shoulder of the portion of the valve body in order to locate the poppet relative to the valve body.

* * * * *